US012380870B2

(12) United States Patent
Trellert

(10) Patent No.: US 12,380,870 B2
(45) Date of Patent: Aug. 5, 2025

(54) SINGING BOWL MAGNETIC ATTACHMENT

(71) Applicant: Chase Michael Trellert, Port Coquitlam (CA)

(72) Inventor: Chase Michael Trellert, Port Coquitlam (CA)

(*) Notice: Subject to any disclaimer, the term of this patent is extended or adjusted under 35 U.S.C. 154(b) by 243 days.

(21) Appl. No.: 18/353,066

(22) Filed: Jul. 15, 2023

(65) Prior Publication Data

US 2025/0022444 A1 Jan. 16, 2025

(51) Int. Cl.

*G10D 13/02* (2020.01)
*G10D 13/06* (2020.01)
*G10D 13/10* (2020.01)

(52) U.S. Cl.

CPC ............. *G10D 13/28* (2020.02); *G10D 13/06* (2013.01)

(58) Field of Classification Search

CPC ............................... G10D 13/28; G10D 13/06
See application file for complete search history.

(56) References Cited

U.S. PATENT DOCUMENTS

2020/0113305 A1* 4/2020 Guenot .................. A46B 17/02
2025/0022444 A1* 1/2025 Trellert .................. G10D 13/06

FOREIGN PATENT DOCUMENTS

JP 3167645 U * 5/2011
JP 2011156419 A * 8/2011
JP 2011177492 A * 9/2011
JP 3213973 U * 12/2017

* cited by examiner

*Primary Examiner* — Robert W Horn

(57) ABSTRACT

The present invention in some embodiments thereof, describes a magnet attachment system for singing bowls in the field of musical instruments. This magnet attachment system utilizes high-powered magnets strategically placed inside and at the bottom exterior of the singing bowl. The magnetic system securely adheres the bowl to a steel plate, offering improved stability, enhanced playability, and increased resonance through reduced surface contact. Further, the magnetized bowls can be easily handheld, connected to one another using a magnetic rod, or assembled on a bowl tree for simultaneous play. The system describes neodymium magnets, double adhesive pads for secure fixation of magnets, a metallic plate (preferably stainless steel) for support, and non-slip high-density foam or pad for cushioning the support plate and provide grip.

18 Claims, 1 Drawing Sheet

SINGING BOWL MAGNETIC ATTACHMENT

FIELD OF INVENTION

The present invention relates to the field of musical instruments, specifically singing bowls. More particularly, it pertains to a magnet attachment system designed to enhance the playability, stability, and versatility of singing bowls.

BACKGROUND OF THE INVENTION

Singing bowls have a rich history that dates back centuries and are deeply rooted in various cultures around the world. These musical instruments, traditionally made from metal alloys or crystals, produce resonant tones when struck or played along the rim with a mallet. Singing bowls have been used for various purposes, including meditation, healing practices, and spiritual ceremonies. They have long been cherished for their resonant tones and their use in various cultural and spiritual practices. To enhance the playing experience and protect the bowls, singing bowl cushions have been utilized. These cushions come in different shapes, sizes, and materials, providing support, stability, and resonance to the singing bowls.

Traditionally, singing bowls were mostly equipped with O-rings made of foam or rubber. These O-rings were placed between the bowl and the underlying surface to create a gap, preventing rattling and allowing for rim playing with a mallet. While O-rings served their purpose to some extent, they had limitations in terms of stability, resonation, and the ability to attach multiple bowls for simultaneous play.

Singing bowl pads are another popular option, available in various sizes and fabrics. They offer protection from scratches, dents, and provide a fuller tone. Square cushions, on the other hand, are luxurious and often larger, making them ideal for display purposes. They raise the height of the bowl, making them suitable for professional settings and sound therapy.

Round turban cushions are thick and prove useful in professional settings, as they allow the bowl to be placed near the client's body. Ring cushions, donut-shaped with a space in the middle, offer functionality and aesthetic appeal. Felt cushions, preferred by many, provide a steady surface and create clear, full sounds. Rubber rings and Tibetan wool mats also serve as additional cushioning options.

In recent times, the Zen Ultragrip Handle Tool has been introduced, utilizing suction to attach itself to the base or center of the singing bowl. This tool is particularly useful in sound therapy practices that require movement and manipulation of the bowl.

While these singing bowl cushions have served their purpose, there is a need for further innovation to enhance stability, playability, and versatility. The traditional singing bowl cushions, such as foam or rubber O-rings, have limitations in terms of stability, resonation, and the ability to attach multiple bowls for simultaneous play. The magnet attachment system introduced in this invention aims to overcome these limitations and provide a new approach to enhance the overall performance of singing bowls.

The present invention aims to address these needs through the introduction of a magnetic attachment system for singing bowls. This system, by utilizing high-powered magnets and a supporting steel plate, offers improved stability, enhanced playability, and increased resonance. It allows for easy handheld usage, attachment of multiple bowls, and opens up expanded musical possibilities.

SUMMARY OF THE INVENTION

The following summary is an explanation of some of the general inventive steps for the device and apparatus in the description. This summary is not an extensive overview of the invention and does not intend to limit its scope beyond what is described and claimed as a summary.

In some aspects, the present invention introduces a novel magnet attachment system for singing bowls, aimed at enhancing their playability, stability, and versatility. The system involves the use of high-powered magnets attached to both the bottom and the inside of the singing bowl, allowing it to securely adhere to a steel plate. This magnet attachment system offers several advantages over traditional cushioning methods.

By securely magnetizing the bowls, the system improves stability, minimizing the risk of tipping over during play. The reduced surface contact between the bowl and the underlying support enhances resonance and contributes to improved sound quality. Additionally, the magnetized bowls can be easily handheld, attached to one another using a magnetic rod, or connected to a bowl tree for simultaneous play of multiple bowls, providing expanded musical possibilities.

The magnet attachment system provides a practical and efficient solution to the limitations of traditional singing bowl cushions. It offers improved stability, enhanced playability, and increased resonance, making it a valuable tool for musicians, practitioners, and enthusiasts. With this innovative system, singing bowls can reach new levels of performance and inspire creative expression in various musical and spiritual practices.

BRIEF DESCRIPTION OF THE DRAWINGS

The novel features believed to be characteristic of the illustrative embodiments are set forth in the appended claims. The illustrative embodiments, however, as well as a preferred mode of use, further objectives and descriptions thereof, will best be understood by reference to the following detailed description of one or more illustrative embodiments of the present disclosure when read in conjunction with the accompanying drawings, wherein:

DETAILED DESCRIPTION OF THE PREFERRED EMBODIMENTS

Hereinafter, the preferred embodiment of the present invention will be described in detail and reference made to the accompanying drawings. The terminologies or words used in the description and the claims of the present invention should not be interpreted as being limited merely to their common and dictionary meanings. On the contrary, they should be interpreted based on the meanings and concepts of the invention in keeping with the scope of the invention based on the principle that the inventor(s) can appropriately define the terms in order to describe the invention in the best way.

It is to be understood that the form of the invention shown and described herein is to be taken as a preferred embodiment of the present invention, so it does not express the technical spirit and scope of this invention. Accordingly, it should be understood that various changes and modifications may be made to the invention without departing from the spirit and scope thereof.

The present invention is a magnet attachment system designed specifically for singing bowls, aimed at improving their playability, stability, and versatility. The system utilizes high-powered magnets that are attached to both the bottom and the inside of the singing bowl, allowing it to securely adhere to a steel plate.

Figure 1:
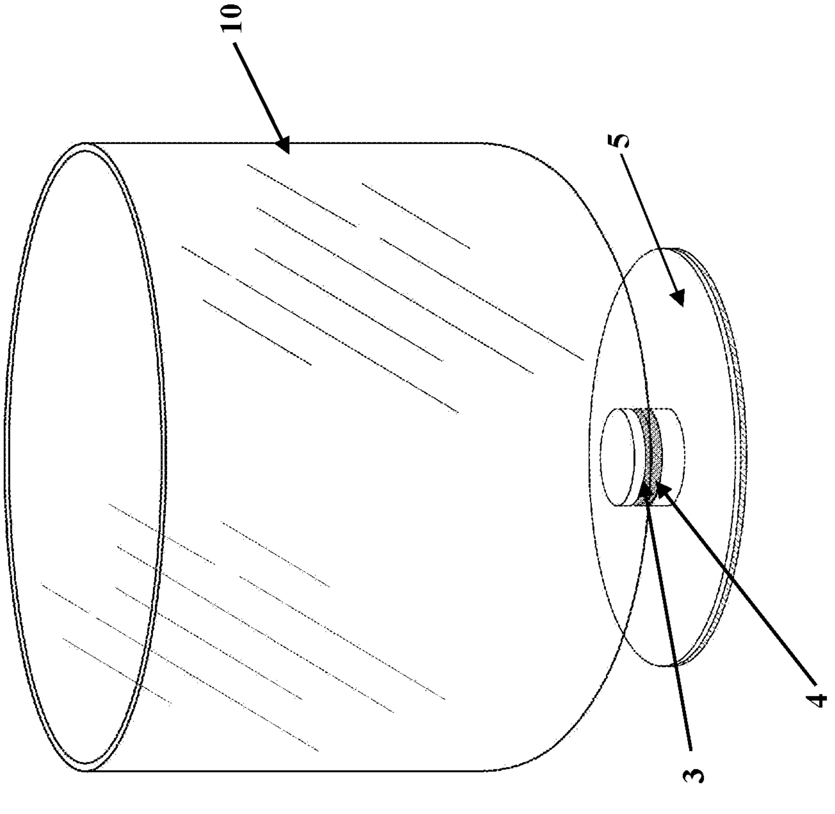
FIG. 1 and FIG. 2 show the magnet attachment system according to one embodiment.
Figure 2:
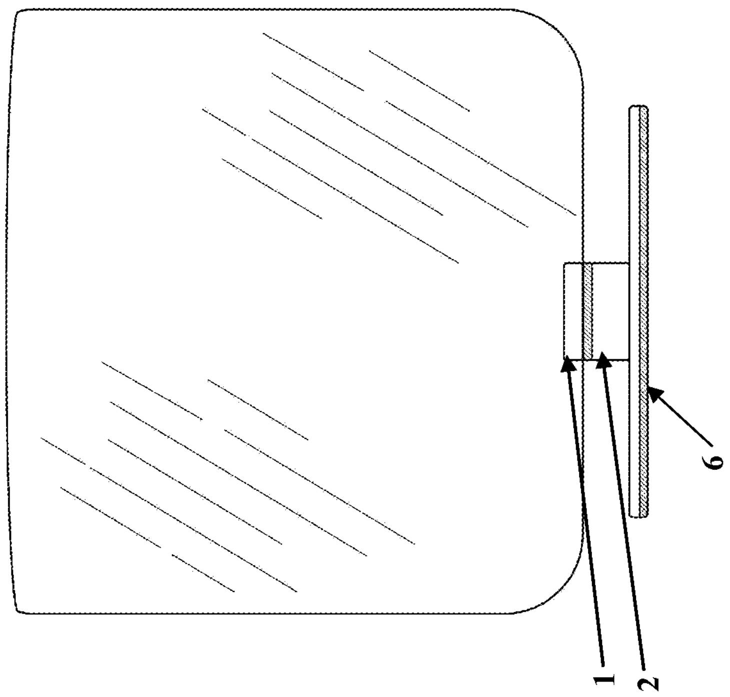

In FIG. 1 and FIG. 2 the magnet attachment system is depicted, showcasing the components in one non-limiting embodiment. The bowl is shown as 10, which represents the singing bowl to which the magnet attachment system is applied. The dual magnets 1 and 2 are shown in the figure. These magnets are strategically positioned to attract by having opposite poles face each other, with one magnet attached to the bottom outside of the bowl and the other magnet affixed to the bottom inside of the bowl. The magnets enable adhering the bowl to the steel plate 5, which provides support and stability.

The non-slip foam 6, shown on the steel plate, acts as a cushioning material, offering grip and preventing the bowl from slipping. Additionally, the figures highlight the presence of double-sided adhesive pads 3 and 4 on each of the magnets 1 and 2 respectively, which ensure a secure and permanent fixation of the magnets to the bowl.

To implement the magnet attachment system, the first step involves affixing a double-sided sticky tape pad to one side of a preferably Neodymium Magnet of a preferable dimension.

This magnet is then securely attached to the bottom of the singing bowl on the outside, ensuring a permanent fixation. The process is repeated with another magnet and sticky pad, this time attaching it to the inside of the bowl. The magnets are configured in such a way that their attractive poles face the bowl, both on the outside and the inside.

Once the magnets are in place, the magnetized singing bowl can be placed onto a steel plate or any other magnetic support plate, which is equipped with a non-slip high-density pad 3 such as an Eva Foam base for cushioning and grip. The magnet attachment provides improved stability, minimizing the risk of the bowl tipping over during play. It also enhances resonance by reducing surface contact between the bowl and the underlying support, resulting in a clearer and more vibrant sound.

One advantage of the magnet attachment system is its versatility. The magnetized bowls can be easily handheld, allowing for more expressive playing techniques. They can also be attached to one another using a magnetic rod, enabling simultaneous play of multiple bowls and expanding musical possibilities. Additionally, the magnetized bowls can be connected to a bowl tree, creating a visually striking display while facilitating synchronized play.

The magnet attachment system offers a practical and innovative solution to the limitations of traditional singing bowl cushions. It improves stability, enhances playability, and increases resonance, providing musicians, practitioners, and enthusiasts with a valuable tool for their musical and spiritual practices. With this magnet attachment system, singing bowls can reach new levels of performance and inspire creativity in various contexts.

With the magnets securely attached to the bottom and inside of the singing bowl, the bowl can be effortlessly placed on a steel plate equipped with a non-slip high-density Eva Foam base. This setup ensures optimal stability, preventing the bowl from rattling or tipping over during play. The magnets' strong adhesive properties guarantee a firm and reliable attachment, providing musicians and practitioners with a rich experience.

Moreover, the magnet attachment system significantly improves the bowl's resonance and playability. The reduced surface contact between the bowl and the underlying support allows for a clearer and more resonant sound, enhancing the overall sonic quality. This opens up new possibilities for musicians, sound therapists, and meditation practitioners to explore different tones and harmonics, creating immersive and transformative experiences.

Additionally, the magnet attachment system provides a practical and user-friendly solution. The process of attaching the magnets to the singing bowl is simple and efficient. The use of a steel plate as the supporting surface offers stability and durability. The non-slip high-density EVA foam base provides cushioning and grip, preventing the bowl from slipping or moving during play. This combination of materials ensures a solid foundation for the magnetized bowl, allowing musicians and practitioners to focus on their performance without worrying about stability issues.

The magnet attachment system is designed to accommodate singing bowls of different sizes. The size of the neodymium magnets can be adjusted based on the bowl size, ensuring a proper fit and optimal magnetization. This versatility allows musicians to apply the system to a wide range of singing bowls, expanding their creative possibilities and adapting to individual preferences.

The magnetized singing bowls can be effortlessly handheld, enabling musicians to explore a wide range of playing techniques, from traditional mallet strikes to rim playing with greater control and precision. The ability to connect the magnetized bowls to a bowl tree creates a visually captivating arrangement while allowing for simultaneous play, making it ideal for group meditations, sound baths, and performances.

Important to note is that the invention embraces all alternatives, modifications, equivalents and variations that are within the spirit and scope of the disclosed subject matter. The invention is designed to be flexible and adaptable, so that it can be used in a variety of contexts. Additionally, the invention can be used with different devices, and can be customized to suit different user preferences.

Industrial Application

The present invention has diverse industrial applications, including the music industry, sound therapy, meditation practices, and more. Manufacturers and retailers of singing bowls can integrate this system into their products, offering musicians and sound healers an innovative and enhanced playing experience. It finds use in recording studios and live performances, providing stable placement and improved sound quality. The system also benefits individuals practicing meditation at home, adding stability and resonance to their bowls. Moreover, the sleek design and versatility of the system make it suitable for art and decorative applications, allowing singing bowls to be showcased as visually appealing pieces in various settings.

What is claimed is:

1. A singing bowl support system comprising:

a first magnet having a double adhesive pad on one polar side, the magnet adhered inside a singing bowl at the bottom;

a second magnet having a double adhesive pad on the polar opposite side of the first magnet, adhered at the bottom of a singing bowl on its outside;

a magnetic metal plate with sufficient area to support the singing bowl, attached to the second magnet to provide support; and a non-slip foam on one side of the magnetic metal plate, providing cushioning and grip on a surface.

2. The singing bowl support system of claim 1, wherein the first and second magnets are Neodymium magnets with sizes ranging from 1-2" in diameter, depending on the size of the singing bowl.

3. The singing bowl support system of claim 1, wherein the double adhesive pads are made of Eva Foam, securely fastening the magnets to the singing bowl.

4. The singing bowl support system of claim 1, wherein the magnetic metal plate is made of Stainless Steel.

5. The singing bowl support system of claim 1, wherein the non-slip foam is high-density Eva Foam that provides both cushioning and grip on a surface.

6. The singing bowl support system of claim 1, wherein the first and second magnets are configured such that their attractive poles face the singing bowl, ensuring a strong magnetic connection.

7. The singing bowl support system of claim 1, further comprising a magnetic rod for attaching multiple magnetized singing bowls together for handheld play.

8. The singing bowl support system of claim 1, further comprising a bowl tree for connecting and supporting multiple magnetized singing bowls simultaneously, expanding musical possibilities.

9. The singing bowl support system of claim 1, wherein the magnet attachment system provides enhanced stability, improved playability, and increased resonance of the singing bowls.

10. A method for attaching a magnet attachment system to a singing bowl, comprising:

affixing a first magnet with a double adhesive pad to the inside bottom of the singing bowl;

affixing a second magnet with a double adhesive pad to the outside bottom of the singing bowl;

configuring the magnets with their attractive poles facing the singing bowl;

attaching a magnetic metal plate to the second magnet to provide support, and;

placing a non-slip foam on one side of the magnetic metal plate to provide cushioning and grip on a surface.

11. The method of claim 10, wherein the first and second magnets used for attaching the magnet attachment system to the singing bowl are Neodymium magnets.

12. The method of claim 10, wherein the affixed double adhesive pads are made of Eva Foam.

13. The method of any of claim 10, wherein the magnetic metal plate used for providing support is made of Stainless Steel.

14. The method of any of claim 10, further comprising placing high-density Eva Foam as the non-slip foam on one side of the magnetic metal plate to provide both cushioning and grip on a surface.

15. The method of any of claim 10, wherein the magnets are configured such that their attractive poles face the singing bowl, ensuring a strong magnetic connection between the magnets and the bowl.

16. The method of any of claim 10, further comprising attaching multiple magnetized singing bowls together using a magnetic rod for handheld play.

17. The method of any of claim 10, further comprising connecting and supporting multiple magnetized singing bowls simultaneously using a bowl tree, expanding the range of musical possibilities.

18. A singing bowl equipped with the magnet attachment system of claim 1 comprising the first and second magnets, the magnetic metal plate, and the non-slip foam, providing enhanced stability, improved playability, and increased resonance.

* * * * *